United States Patent
Garg

(10) Patent No.: US 6,601,080 B1
(45) Date of Patent: Jul. 29, 2003

(54) HYBRID REPRESENTATION SCHEME FOR FACTOR L IN SPARSE DIRECT MATRIX FACTORIZATION

(75) Inventor: Rajat P. Garg, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/510,911

(22) Filed: Feb. 23, 2000

(51) Int. Cl.[7] ................................. G06F 7/38
(52) U.S. Cl. ........................ 708/502; 708/490
(58) Field of Search ................ 708/446, 607, 708/160, 200, 490, 520; 710/68; 707/101

(56) References Cited

U.S. PATENT DOCUMENTS

| | | | | |
|---|---|---|---|---|
| 5,107,452 A | * | 4/1992 | Karmarkar et al. | 708/607 |
| 5,490,278 A | * | 2/1996 | Mochizuki | 708/446 |
| 5,548,798 A | * | 8/1996 | King | 710/68 |
| 5,983,230 A | * | 11/1999 | Gilbert et al. | 707/101 |
| 6,397,236 B1 | * | 5/2002 | Garg et al. | 708/446 |
| 6,470,368 B1 | * | 10/2002 | Garg et al. | 708/446 |

OTHER PUBLICATIONS

Anshul Gupta, Highly Scalable Paralel Algorithms for Sparse Matrix Factorization, May 1997, IEEE Transactions on Parallel and Distributed Systems vol. 8 No. 5, p. 502–520.*

Groz et al., Processing Apparatus for Performing Preconditioning Process through Multilevel Block Incomplete Factorization, Jul. 25, 2002, U.S. patent application Publication No. US2002/0099748 A1.*

Heath et al..; "Parallel Algorithms for Sparse Linear Systems", Parallel Algorithms for Matrix Computations; Society for Industrial and Applied Mathematics by Gallivan, et al.; Copyright 1990; pp. 83–124.

* cited by examiner

Primary Examiner—Chuong Dinh Ngo
Assistant Examiner—Chat C. Do
(74) Attorney, Agent, or Firm—Park, Vaughan & Fleming LLP; Pavel I. Pogodin

(57) ABSTRACT

A system that efficiently performs a CMOD operation in solving a system of equations involving a sparse coefficient matrix by identifying supernodes in the sparse matrix. Each supernode comprises a set of contiguous columns having a substantially similar pattern of non-zero elements. The system performs a CMOD operation on each supernode, by determining a structure for the supernode, and computing a function of the structure. The system uses a one-dimensional trapezoidal representation for the supernode during the CMOD operation, if the result of the function is lower than a threshold value, and otherwise uses a two-dimensional rectangular representation for the supernode. The function of the structure of the supernode is a function of a number of computational operations involved in computing a lower-triangular sub-block portion of the supernode and a number of computational operations involved in computing a rectangular sub-block portion of the supernode.

18 Claims, 7 Drawing Sheets

HYBRID REPRESENTATION SCHEME FOR FACTOR L IN SPARSE DIRECT MATRIX FACTORIZATION

RELATED APPLICATIONS

The subject matter of this patent application is related to the subject matter U.S. Pat. No. 6,397,236. The subject matter of this patent application is also related to the subject matter U.S. Pat. No. 6,470,368.

BACKGROUND

1. Field of the Invention

The present invention relates to computer systems for performing sparse matrix computations. More particularly, the present invention relates to a method and an apparatus that uses a hybrid one-dimensional trapezoidal and two-dimensional rectangular representation for a factor in solving a system of linear algebraic equations involving a sparse coefficient matrix.

2. Related Art

The solution of large sparse symmetric positive-definite systems of equations constitutes the primary computational cost in numerous applications, such as finite-element design, linear programming, circuit simulation and semiconductor device modeling. Efficient solution of such systems has long been the subject of research, and considerable progress has been made in developing efficient algorithms to this end. A direct solution technique known as "Cholesky Factorization" is the most widely used approach to solve such a system. Under Cholesky factorization, the complete solution sequence requires many stages, including matrix reordering, symbolic factorization, numerical factorization and triangular solution. Of these stages, numerical factorization is typically the most computationally expensive.

One method of performing numerical factorization is based on a right-looking supemode-supemode method described in "Parallel Algorithms for Sparse Linear Systems" by Michael T. Heath, Esmond Ng and Barry W. Peyton, in "Parallel Algorithms for Matrix Computations" by Gallivan, et al. (Editors), SIAM (1994) (referred to as HNP). In a sparse matrix, a supernode is a set of contiguous columns that have essentially the same sparsity structure. Supernodes can be used to organize the numerical factorization stage around matrix-vector (supemode-column) and matrix-matrix (supernode-supernede) primitive operations leading to a substantial performance improvement arising from more efficient use of the processor caches and pipelining units.

The numerical factorization step involves two fundamental sub-tasks:

(1) cdiv(j): division of column j of the factor by a scalar; and (2) cmod(j,k): modification of column j by column k, k<j.

These sub-tasks can be organized around supernodes. For example, DIV(j) can be organized as an internal factorization/update of supernode j, and CMOD(j,k) can be organized as a modification of supernode j by supernode k, k<j.

Typically, the second sub-task is where the bulk of the computational cost is incurred. In order to increase computational efficiency, the CMOD(j,k) operation can be divided into three steps (see HNP):

(a) computation of the update and accumulation into a temporary array;

(b) carrying out the non-zero index matching between the first columns of the source and destination supernodes and computing relative indices; and (c) scattering updates from the temporary vector into the target destination supernode.

By dividing the CMOD(j,k) operation in this way, it is possible to apply techniques used in dense matrix operations in the step (a). Note that step (a) is where the dominant amount of time is spent. In the discussion that follows, we refer the step (a) as the "local dense CMOD operation". The local dense CMOD operation involves computing a trapezoidal-shaped dense update that can be represented as a combination of a dense rank-k update and a matrix multiplication.

Library routines can be used to speed up the CMOD computation. These library routines are typically written in assembly language and are hand-tuned for a specific machine architecture. For example, on the current generation of ULTRASPARC-II™-based machines, the SUN PERFORMANCE LIBRARY™ (see http://www.sun.com/workshop/performance/wp-perflib/) provides SPARC™ assembly-language implementations of BLAS1, BLAS2 and BLAS3 routines. These hand-tuned assembly language implementations can yield performance close to the theoretical peak of the underlying processor.

For example, portions of the CMOD operation can be efficiently performed by invoking matrix multiplication code from the Sun Performance Library (specifically, the BLAS3 dgemm code). Unfortunately, invoking the BLAS3 dgemm matrix multiplication code requires supernodes to be copied into and out of temporary storage because of incompatibility between data-structures used by a typical sparse solver and those expected by the dgemm API. This copying can add a significant overhead. Consequently, using the BLAS3 "dgemm" matrix multiplication code only makes sense for supernodes above a certain size. Otherwise, the performance gains from using the BLAS3 "dgemm" library code are cancelled out by the additional overhead involved in copying.

Hence, what is needed is a system that performs the CMOD operation using library routines in cases where the performance gains from using the library routines exceed the computational overhead required to use the library routines.

Another difficulty in attaining high performance in numerical factorization is due to the fact that supernodes can have varying shapes, sizes, and sparsity patterns. These varying shapes, sizes and sparsity patterns can greatly influence computational performance. In order to optimize computational performance for the CMOD operation, the supernodes of varying shapes and sizes must be divided into smaller sub-units for computation so as to balance computational operations with memory references in a way that is tuned for the particular machine architecture on which the computation is to be run.

Yet another difficulty in attaining high performance in sparse factorization is due to the fact that direct solution methods have high memory storage requirements that necessitate using a compact storage scheme, such as a one-dimensional trapezoidal representation, that makes integration of library routines (such as BLAS3) directly into the CMOD operation difficult. Other storage schemes, such as two-dimensional rectangular block representations can be used, which are easier to integrate with library routines, but these other storage schemes architecture a storage penalty.

What is needed is a system that performs the CMOD operation by taking advantage of a two-dimensional rectangular representation for supernodes when it is advantageous to do so, but otherwise uses a compact one-dimensional trapezoidal representation for supernodes.

SUMMARY

One embodiment of the present invention provides a system that efficiently performs a CMOD operation in solving a system of linear algebraic equations involving a sparse coefficient matrix. The system operates by identifying supernodes in the sparse matrix, wherein each supernode comprises a set of contiguous columns having a substantially similar pattern of non-zero elements. Next, the system performs a CMOD operation on the supernodes. This involves for each supernode, determining a structure for the supernode, and computing a function of the structure. The system uses a one-dimensional trapezoidal representation for the supernode during the CMOD operation, if the result of the function is lower than a threshold value, and uses a two-dimensional rectangular representation for the supernode during the CMOD operation if the result of the function is greater than the threshold value.

In one embodiment of the present invention, the function on the structure of the supemode is a function of a number of computational operations involved in computing a lower-triangular sub-block portion of the supernode and a number of computational operations involved in computing a rectangular sub-block portion of the supernode.

In one embodiment of the present invention, the system splits each supernode into vertical panels that fit into cache lines within a cache of a processor performing the computation prior to performing the CMOD operation.

In one embodiment of the present invention, the function on the structure of the supemode is a function of the memory requirements for storing the supernode in the two-dimensional rectangular representation and the memory requirements for storing the supernode in the one-dimensional trapezoidal representation.

In one embodiment of the present invention, the system additionally performs a CDIV operation on the plurality of supernodes prior to performing the CMOD operation. This CDIV operation divides each element in each column by a scalar value for normalization purposes (see HNP).

In one embodiment of the present invention, the system uses the two-dimensional rectangular representation for the supernode during the CMOD operation if the supernode is a root supernode. The "root" supernode is the rightmost supernode, which is typically in the rightmost corner of the triangular matrix (see HNP).

In one embodiment of the present invention, in performing the CMOD operation, the system additionally stores a result of the CMOD operation in a temporary vector, and scatters a contents of the temporary vector into a destination representation of the sparse matrix.

DETAILED DESCRIPTION

The following description is presented to enable any person skilled in the art to make and use the invention, and is provided in the context of a particular application and its requiremhents. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a carrier wave. For example, the carrier wave may carry information across a communications network, such as the Internet.

Computer System

Figure 1:
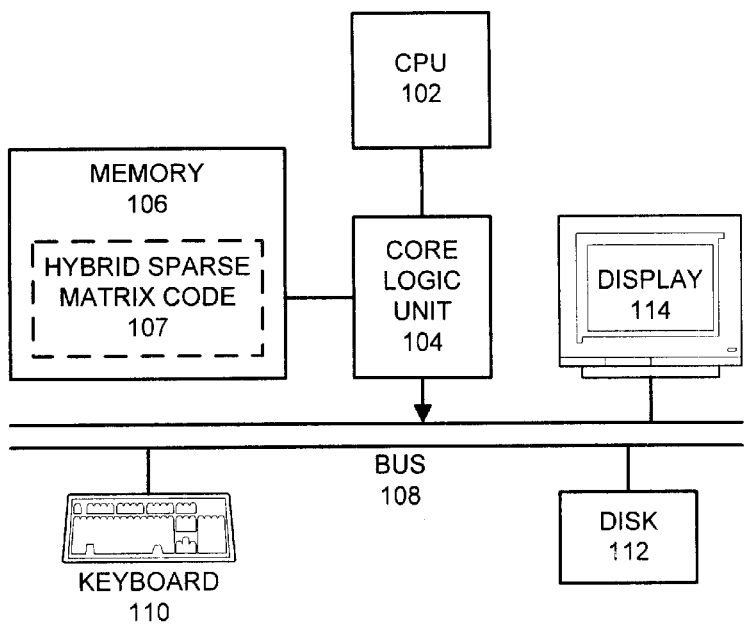
FIG. 1 illustrates a computer system in accordance with an embodiment of the present invention.

FIG. 1 illustrates a computer system in accordance with an embodiment of the present invention. The computer system illustrated in FIG. 1 includes central processing unit (CPU) 102, core logic unit 104, memory 106, bus 108, display 114, keyboard 110 and disk 112. More specifically, core logic unit 104 couples CPU 102 with memory 106. CPU 102 may include any type of computational engine for executing programs within the computer system. This includes, but is not limited to, a microprocessor, a device controller and a computational device within an appliance. Memory 106 may include any type of random access memory for storing code and data for use by CPU 102. As illustrated in FIG. 1, memory 106 includes hybrid sparse matrix code 107. Core logic unit 104 includes circuitry for interconnecting various computer system components, including CPU 102, memory 106 and bus 108.

Bus 108 couples core logic unit 104 with display 114, keyboard 110 and disk 112. Bus 108 may include any type of communication channel for coupling core logic unit 104 with peripheral devices, such as display 114, keyboard 110 and disk 112. Display 114 may include any type of device for displaying images from a computer system. Disk 112 may include any type of non-volatile storage device for storing code and data to for use by CPU 102. This includes, but is not limited to, magnetic storage devices, such as a disk drive, and electronic storage devices, such as flash memory or battery backed up RAM. Keyboard 110 may include any type of device for inputting data into the computing system. This includes input devices such as a keyboard and a mouse.

Note that although a specific computer system architecture is illustrated in FIG. 1, the present invention may be used with any computational device that can execute a computer program, including a microprocessor system, a mainframe computer system, a device controller and a computing device in an appliance.

Cholesky Factorization

Figure 2:
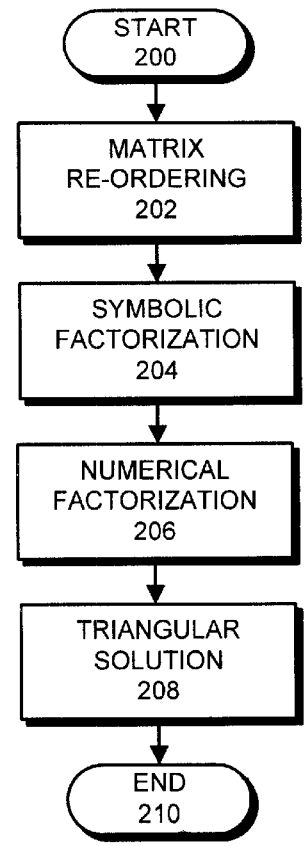
FIG. 2 illustrates the major stages involved solving a sparse symmetric positive definite system of equations.

FIG. 2 illustrates the major stages involved solving a sparse symmetric positive definite systems of equations. The system starts an equation of the form Ax=b, "where A is an n×n sparse matrix that is both symmetric and positive-definite, b is a known vector and x is the unknown solution vector to be computed. One way to solve the linear system is to first compute the Cholesky factorization $A=LL^T$, where the Cholesky factor L is a lower triangular matrix with positive definite diagonal elements. Then the solution vector x can be computed by successive forward and back substitutions to solve the triangular systems Ly=b and $L^Tx=y$." (see page 84 of HNP above)

As mentioned above, the Cholesky factorization approach involves a number of stages, including matrix reordering (step 202), symbolic factorization (step 204), numerical factorization (step 206) and triangular solution (step 208). he matrix reordering step 202 involves shuffling around the rows and columns of the sparse matrix so that "fill in" of zero elements with non-zero values gets reduced. During numerical factorization, "fill in" increases the number of non-zero elements in the sparse matrix and hence reduces computational performance.

The symbolic factorization step 204 determines which entries will become non-zero values and identifies supemodes. As mentioned above, a supernode is a set of contiguous columns that have essentially the same sparsity structure. Supernodes can be used to organize the numerical factorization stage around matrix-vector (supernode-column) and matrix-matrix (supernode-supernode) primitive operations leading to a substantial performance improvement arising from more efficient use of the limited space that is available in the caches and pipelining units of the processor that is performing the computation. The symbolic factorization step 204 also involves allocating memory needed to solve the sparse matrix.

Next, the numerical factorization step 206 is performed using Gaussian elimination (or some equivalent solution technique) on the sparse matrix. Note that this generally requires $O(n^3)$ time for an n×n dense matrix. (Also note that $O(n^3)$ is a well known metric for computational complexity which says the number of computational operations in the computation is proportionate to the cube of the matrix dimension size "n.")

Finally, the triangular solution step 208 solves the remaining triangular system of equations.

Of the four above-listed steps, the numerical factorization step 206 consumes most of the computational time.

Figure 3:
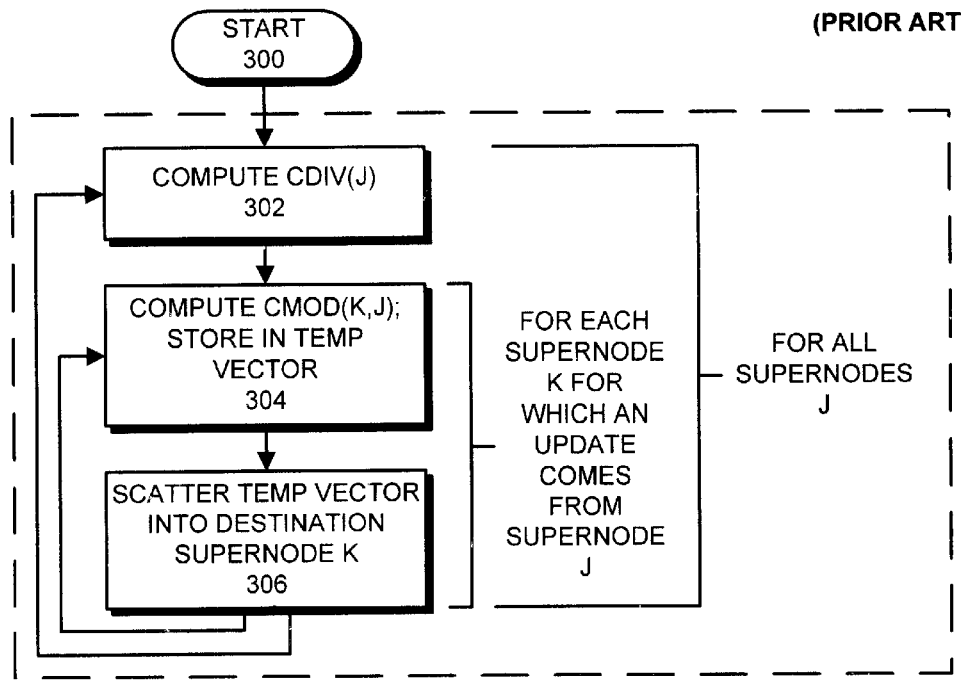
FIG. 3 illustrates some of the steps involved in numerical factorization in accordance with an embodiment of the present invention.

FIG. 3 illustrates some of the steps involved in numerical factorization in accordance with an embodiment of the present invention. As mentioned above, the numerical factorization step 206 involves two fundamental sub-tasks:

(1) cdiv(j): division of column j of factor by a scalar; and (2) cmod(j,k): modification of column j by column k, k<j.

These sub-tasks can be organized around supernodes. For example, CDIV(j) can be organized as an internal factorization/update of supernode j, and CMOD(j,k) can be organized as a modification of supernodej by supemode k, k<j. More specifically, computing CDIV(j) for a matrix L involves computing for(i=j to n) $\{L_{ij}=L_{ij}/L_{jj}\}$. Similarly, computing CMOD(k,j) involves computing for(i=j to n) $\{L_{ik}=L_{ik}-L_{jk}*L_{ij}*L_{jj}\}$.

The computation illustrated in FIG. 3 is includes an outer loop and an inner loop. The outer loop is executed for all source supernodes j. In this outer loop, CDIV(j) is computed (step 302). Next, the inner loop takes place for each supernode k for which an update comes from supernode j. Within this inner loop, the system computes CMOD(k,j) and stores the result in a temporary vector (step 304). This temporary vector is eventually scattered into destination supernode k (step 306).

Figure 4:
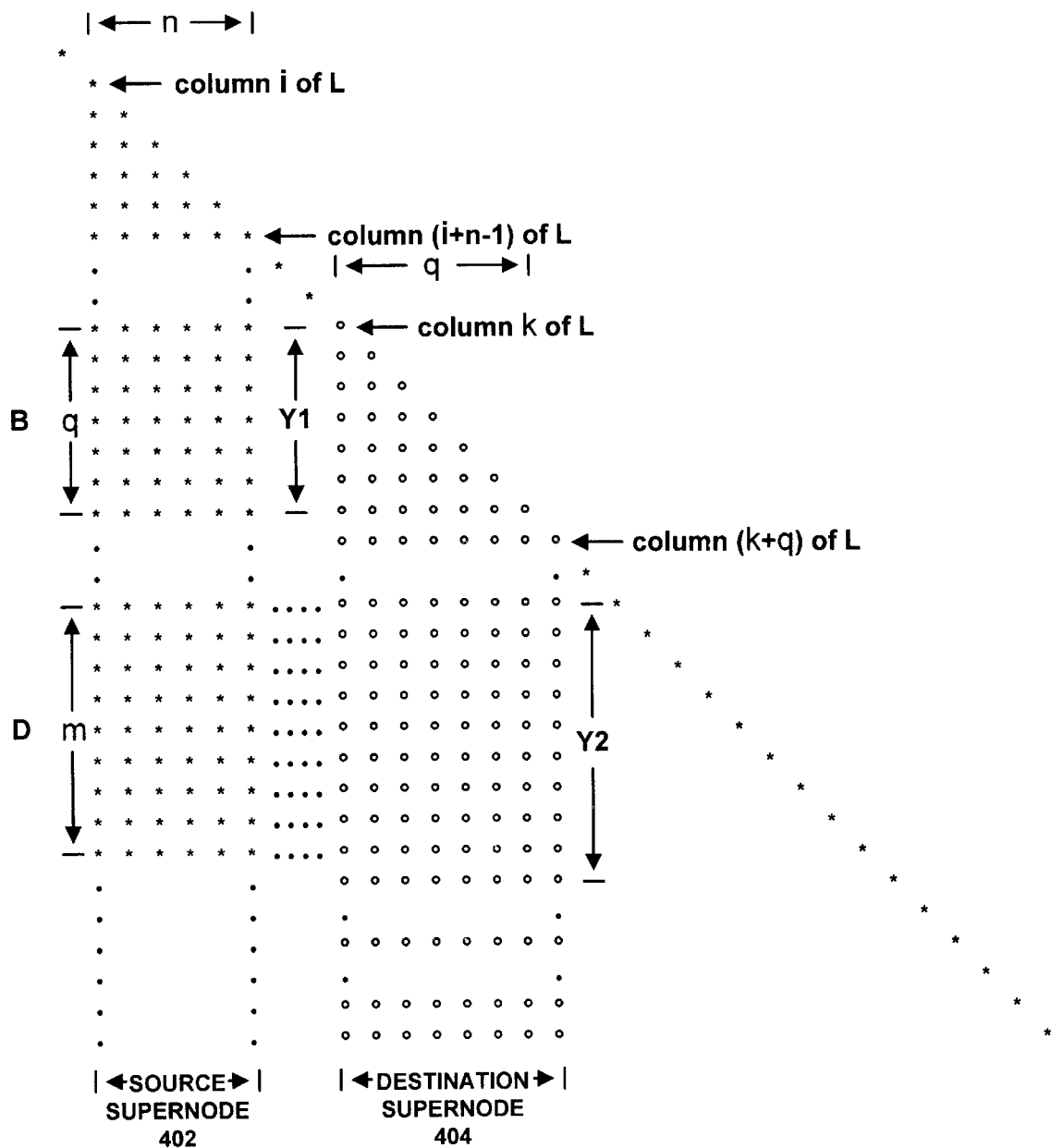
FIG. 4 illustrates the supernode structure of a sparse matrix.

FIG. 4 illustrates the supernode structure of a sparse matrix with two supernodes, source supernode 402 and destination supernode 404. Note the similarity of the sparsity pattern in the columns comprising each supernode. Also note how supernodes provide dense sub-blocks which allow application of dense-matrix operations in numerical factorization step 206. In FIG. 4, sub-blocks in both source supernode 402 and destination supernode 404 occur in contiguous rows of the matrix. Note that in general these supernodes can be interspersed with rows containing zeroes. This does not affect the calculation of "local dense CMOD" because a compact data-structure is used to store the non-zeroes of matrix L. It should be noted that the non-zero structure of destination supernode 404 is necessarily a superset of the non-zero structure of source supernode 402 below row k. The actual non-zero structures of columns i and k are relevant only in the stage where the update from source supernode 402 is scattered into the destination supernode 404. The "local dense CMOD" operation computes the update from source supernode 402 into a portion of the destination supernode 404 as described below.

In FIG. 4, "n" is the number of columns in source supemode 402, "q" is the number of columns updated in the destination supernode 404, and "m" is the common length of update for all updated columns of destination supernode 404.

Also, note from FIG. 4 that B is rectangular sub-block of size q rows and n columns; D is a rectangular sub-block of size m rows and n columns; Y1 is a lower-triangular sub-block of size q rows by q columns; and Y2 is a rectangular sub-block of size m rows by q columns.

The update Y is trapezoidal and can be represented as:

$Y=|Y1|$ $|Y2|$ wherein $Y1=Y1-BB^T$ (rank-n update), and $Y2=Y2-DB^T$ (matrix-multiplication). Thus, the computation of the update can be expressed in terms of matrix library routines.

In the compact storage, the non-zeroes of the factor L are stored column-by-column. Thus, one embodiment of the present invention is represented in C programming language below. Note that in the actual implementation the structure for storing the sparse matrix is more complicated and additional fields are needed to carry the integer row-index information. Only the portion relevant to the local dense CMOD operation is presented below.

Sssume that the number of rows in the matrix=nrows

```
struct {
    int*lcollen; /*array of length nrows*/
    int*supernode; /*array of length nrows with supernode
        info.*/
    double**nz; /*2D array representing the factor L*/
} L;
```

Here,

L.lcollen[i]: length of column i, i=0 . . . (nrows−1)
L.nz[i][j]: j-th entry of i-th column
if L.supernode[i]>0==> it is width of supernode starting at i;
if L.supernode[i]<0==> i th col is in supemrode starting at i+L.supernode[i]

Note that L.nz[i][0] . . . L.nz[i][L.lcollen[i]−1] are non-zeroes in the i-th column. For a given supernode, the columns have following relationship:

L.lcollen[l]=L.lcollen[l−1]−1; l=(i+1)(i+n−1).

The difficulty in using library routines comes from the trapezoidal nature of supernodes. For example, the dgemm API expects the columns of B and D to be stored contiguously, whereas the sparse storage also carried the apex triangle in the supemode.

The (sequential) right-looking supemode-supemode pseudo-algorithm operates as follows:

```
let nsup=the number of supemodes in the matrix
forj=1 . . . nsup{
    compute cdiv(j)
    for each k such that L_{kj}!=0 (k>j) {
        compute number of columns of supernode k modi-
            fied by supemode j
        stor=cmod(k,j) (stor is temporary storage)
        scatter stor into columns of destination supernode k
    }
}
```

One embodiment of the present invention proceeds as follows. (1) In a pre-processing step, the supernodes are split into vertical panels that fit into the L2-cache of the processor that is performing the computation (The level-two (L2) cache is a larger second-level cache this sits between a smaller and faster level-one (L1) cache and memory). The blocking factors are determined based on the size of L2cache at run-time and are such that the panels can be at most 0.5*Size of(L2 Cache). (2) In the right-looking factorization, first the internal update/factorization of the source supernode 402 takes place. This loads all the columns of source supernode 402 into the L2-cache. (3) Next, a loop is started that computes the sequence of updates from source supernode 402 into various destination supernodes 404. Each of these calculations involves performing a local dense CMOD operation. One of the advantages of using steps (1) and (2) is that with proper care, one can ensure that source supernode 402 stays in the L2 cache so that data is reused, which increases cache hit rates.

Hybrid CMOD Operation

The Hybrid CMOD operation compares the dimensions of supernodes against threshold values to determine whether to use C-based kernels or assembly language-based kernels to perform the CMOD operation. Pseudo-code for the hybrid CMOD approach appears below.

```
for the current source supernode being processed {
    while (there are updates left to be computed) {
        identify the destination supernode and find m, q for
            the update
        if (m−q<MCUT && q<QCUT && n<NCUT) {
            initialize temporary storage for Y
            Use C-based kernels to compute the update Y
        }
        else {
            initialize temp storage for Y1
            compute Y1 using C-based kernels
            copy-in B and D into temporary storage invoke
                dgemm to compute Y2 (dgemm automatically
                initializes Y2 storage)
        }
    } end while
} end processing of source supernode
```

The threshold values for the supernode dimensions m, n and q are MCUT, NCUT and QCUT, respectively. These threshold values are empirically determined after extensive testing using a representative sample of sparse matrix equations. In one embodiment of the present invention, the empirically predetermined values are MCUT=28, NCUT=32 and QCUT=16. Note that the code for performing the scattering operation has been tailored for the case where the library routines are used, so that no copy-out is required in case of a library routine call.

Note that the maximum possible size of temporary storage is less than half of L2 cache-size since the supemodes are split into panels restricted to be less than 0.5 *size of (L2cache).

Figure 5:
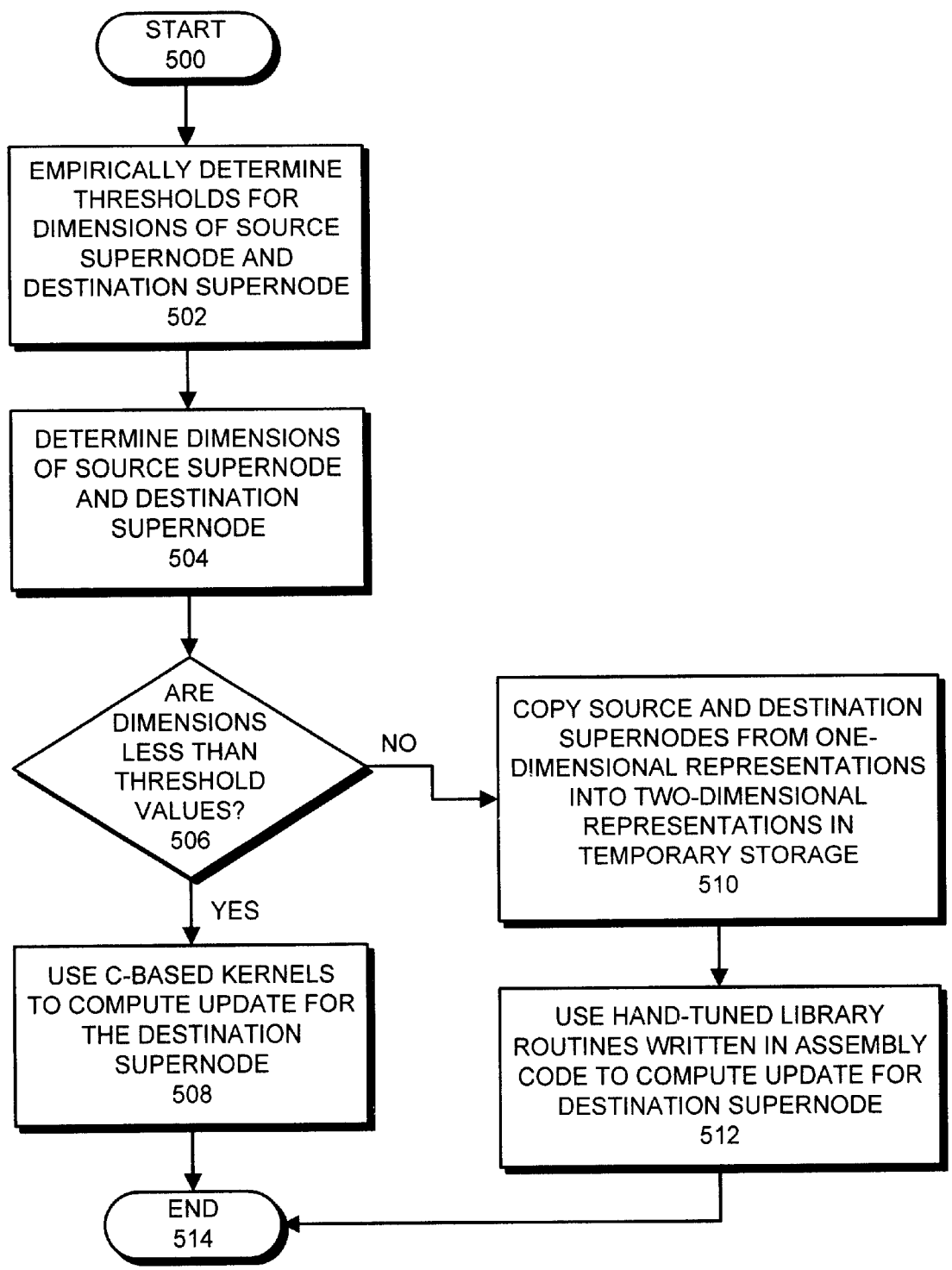
FIG. 5 is a flow chart illustrating a hybrid technique for performing the CMOD operation in accordance with an embodiment of the present invention.

FIG. 5 is a flow chart illustrating a hybrid technique for performing the CMOD operation in accordance with an embodiment of the present invention. This hybrid technique first empirically determines threshold values for dimensions of the source supemode 402 and destination supemode 404 (step 502). These threshold values are used to determine whether to use C-based kernels or assembly language-based kernels to perform the CMOD operation. Recall that using the assembly language kernels introduces copying overhead cannot be justified for smaller supemodes.

Note that threshold values MCUT, NCUT and QCUT can be pre-determined by performing test CMOD operations on representative sparse matrices before the actual CMOD operation takes place. These predetermined values can be stored in a table or some other type of data structure.

Next, the system determines the dimensions of source supernode 402 and destination supernode 404 (step 504). Then the system asks whether the dimensions are less than threshold values MCUT, NCUT and QCUT (step 506). In one embodiment of the present invention, the system determines if all of the dimensions are less than their corresponding threshold values. In another embodiment, the system determines if one of the dimensions is lower than a corresponding threshold value. In general, the system can perform a function on the dimensions to produce a result that is compared with a threshold value.

If the dimensions are less than the threshold values, the supernode dimensions are too small to take advantage of the system library routines because of the copying overhead involved in using the library routines. In this case, the system uses kernels written in a high-level language, such as C, to compute an update for destination supernode 404 (step 508).

If the dimensions are not less than the threshold values, the system copies the supernodes from a compacted one-dimensional representation into a two-dimensional representation that is suitable for the system library routines (step 510). Next, the system uses the hand-tuned system library routines written in assembly language to compute updates for destination supernodes (step 512).

Thus, the present invention automates the selection of the appropriate kernel to substantially optimize performance of the CMOD operation independently of problem structure and problem size.

Tiling Process

Figure 6:
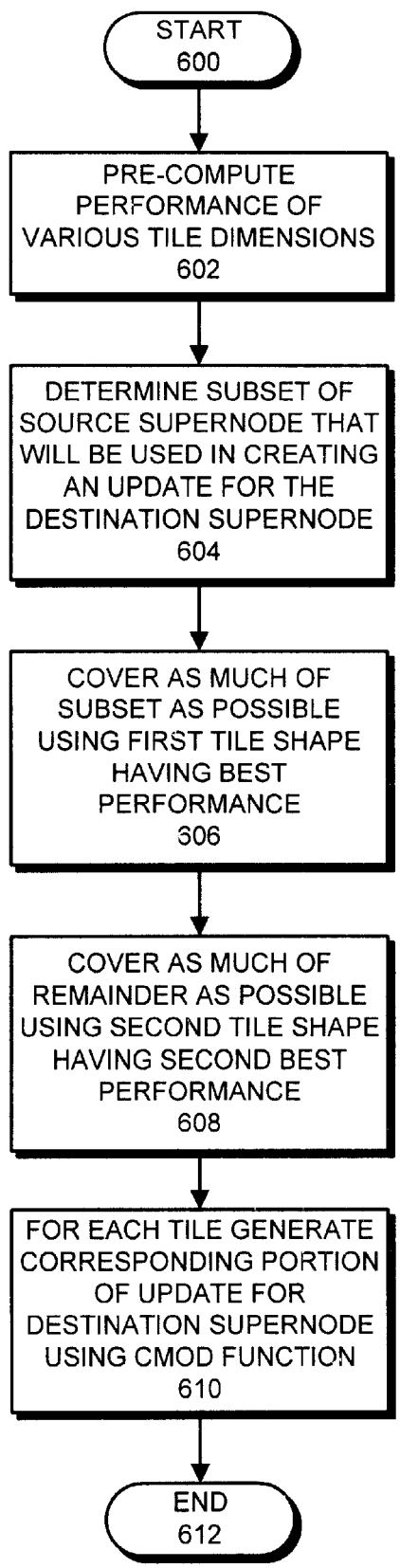
FIG. 6 is a flow chart illustrating the process of using tiling during the CMOD operation in accordance with an embodiment of the present invention.

FIG. 6 is a flow chart illustrating the process of tiling during execution of the C-based kernels for the CMOD operation in accordance with an embodiment of the present invention. In order to optimize computational performance for the CMOD operation, supernodes of varying shapes and sizes are first divided into smaller rectangular sub-units called tiles, and the CMOD operation is structured around operations between these tiles. The tile dimensions are chosen so as to balance computational operations with memory references in a way that is tuned for the particular machine architecture on which the computation is to be run.

The system first pre-computes computational performance for various tile dimensions by simulating computations involving the various tile dimensions on the computer system on which the computation will be performed (step 602). The system next determines a subset of source supernode 402 that will be used to create an update for destination supernode 404 (step 604). Next, the system covers as much of the subset of source supernode 402 as is possible using the tile shape with the best performance (step 606). If there is a remainder after using the best tile shape, the system covers as much of the remainder as possible using a second best tile shape having a second best performance (step 608). Next, for each tile the system generates a corresponding portion of an update for destination supernode 404 by performing a local dense CMOD operation (step 610).

Note that the above embodiment can be extended to include additional tile shapes beyond the best tile shape and the second best tile shape. Also note that in general any possible optimization algorithm can be used to match tile shapes with supernode dimensions. In fact, the tiling problem reduces to a variant of a well-known NP-complete problem known as "two-dimensional bin packing." Hence, optimal solutions to the tiling problem are computationally intractable.

One embodiment of the tiling process is described in more detail as follows. In the C-based kernels, both components of the update (Y1 and Y2) are calculated simultaneously. Pseudo-code for the doubly-tiled triple loop appears below.

```
for kk=1 . . . q,qtile
    {set up pointers for temporary storage}
    for jj=1 . . . n,ntile
        {compute the triangle qtile*qtile of update}
        for ii=1 . . . m+q
            {compute qtile*ntile elements of update}
        endfor
    endfor
endfor
```

For the case of a 4×3 tile in which ntile=4 and qtile=3, the innermost loop can be implemented as follows.

```
for (ileft=thisFirst2+1; ileft<L.1collen[col]; ileft++){
    d0=des0[jright]; d1=dest1[jright-1]; d2=dest2[jright-2];
    ytmp0=L.nz[col][ileft]; d0-=ljk0__0*tmp0; d1-=ljk0__1*tmp0;
    d2-=ljk0__2*tmp0;
    tmp1=L.nz[col1][ileft-1]; d0-=ljk1__0*tmp1; d1-=ljk1__1*tmp1;
    d2-=ljk1__2*tmp1;
    tmp0=L.nz[col2][ileft-2]; d0-=ljk2__0*tmp0; d1-=ljk2__1*tmp0;
    d2-=ljk2__2*tmp0;
    tmp1=L.nz[col3][ileft-3]; d0-=ljk3__0*tmp1; d1-=ljk3__1*tmp1;
    d2-32 ljk3__2*tmp1;
    dest0[jright]=d0; dest1[jright-1]=d1; dest2[jright-2]=d2;
    jright++;
{
```

Note that this implementation attempts to do grouping and delayed writes to in order to give hints to the compiler during the code-generation process. Also note that by unrolling the outer loops, this embodiment linearizes the resulting code, and hence significantly increases both the temporal and spatial locality in the calculations. In one embodiment of the present invention, a special compiler is used to convert the source code into executable code. This compiler pipelines the innermost loop with instructions that are scheduled to make efficient use of the limited amount of space in the L2 cache.

TABLE 1

| Tiles (ntile*qtile) | FP-Ops | Mem-Ops | R = FP-Ops/Mem-ops |
| --- | --- | --- | --- |
| 1 × 1 | 1 | 3 | 0.33 |
| 1 × 2 | 2 | 5 | 0.40 |
| 1 × 3 | 3 | 7 | 0.43 |
| 1 × 4 | 4 | 9 | 0.44 |
| 1 × 6 | 6 | 13 | 0.46 |
| 2 × 1 | 2 | 4 | 0.5 |
| 2 × 3 | 6 | 8 | 0.75 |
| 3 × 3 | 9 | 9 | 1.0 |
| 3 × 4 | 12 | 11 | 1.09 |
| 4 × 1 | 4 | 6 | 0.67 |
| 4 × 2 | 8 | 8 | 1.0 |
| 4 × 3 | 12 | 10 | 1.2 |
| 4 × 4 | 16 | 12 | 1.33 |
| 6 × 1 | 6 | 8 | 0.75 |
| 6 × 2 | 12 | 10 | 1.2 |
| 8 × 1 | 8 | 10 | 0.80 |
| 8 × 2 | 16 | 12 | 1.33 |

Table 1 presents performance characteristics for tiling combinations that were empirically tested on an UltraSparc-II based system, which has 32 floating point registers. Table 1 also lists the number of floating point operations (FP-Ops) and memory operations (Mem-Ops) for each of the tilings. The FP-Ops are counted by considering floating point addition and multiply operations to be one operation. Memory operations include both the load and store operations; no distinction is made between the two.

The performance of a tiling depends on the value of R=FP-Ops/Mem-ops and the number of floating-point registers available on the microprocessor. During extensive testing on representative sparse matrix test problems, it was determined that a 4×4 tiling has a higher R than 4×3. However, on the UltraSparc-II systems the latter performs better due to lower register-pressure which allows tighter code scheduling.

Once good tile shapes are identified, these tile shapes are applied to specific supernode dimensions. For example, one embodiment of the present invention operates as follows. Assume that qmod=q% 3; nmod=n% 4; and nc=n/4. (Recall that n is the number of columns in source supernode 402, and q is the number of columns to be updated in destination supernode 404.) The primary computation is done using 4×3 tiling. Next, if qmod equals 1, a 6×1 tiling is used, and if qmod equals 2 a 6×2 tiling is used. Next, if nmod equals 3 the system covers 4*nc columns with 4×3 tiles and 3 columns with 3×3 tiles; if nmod equals 2 the system covers 4*(nc−1) columns with 4×3 tiles and 6 columns with 3×3 tiles; and if nmod equals 1 the system covers 4*(nc−1) columns with 4×3 tiles, 3 columns with 3×3 tiles, and 2 columns with 2×3 tiles (This avoids a 1×3 remainder column that has quite poor computational performance). The above-described method for accomplishing the tiling process is an extension of the method illustrated in steps 606 and 608 of the flow chart in FIG. 6.

Note that these tilings have been optimized for an UltraSparc-II processor with 32 floating point registers and an L2cache latency of ~8–10 cycles. Similar tilings can be developed for different numbers of floating point registers and different cache latencies. (Also note that the any discussions regarding UltraSparc-II systems in this specification are merely exemplary. The present invention can generally apply to any computing system, and is not limited to UltraSparc-II systems.)

Pseudo-code for the triple loop trapezoidal update appears below. Assume that m and q have been computed already.

nmod=n% 4
    nleft=3
    if (nmod=1 or nrmod=2) nleft=7
    qmod=q% 3
    if (qmod=1)
        {use 6×1 tiling to compute the update}
    else if (qmod=2)
        {use 6×2 tiling to compute the update}
    {move pointers in the temporary storage}
    for (k=qmod; k<q; k+=3) {
        {move set-up pointers to three temporary storage vectors for storing updates to the three destination columns}
        /*first run 4×3 tiling*/
        for j=0; j<n-nleft; j+=4) {
            {set-up the 12-constants in the innermost loop}
            {calculate the 3×3 triangular portion at the apex of the three destination columns separately}
            {compute istart value for innermost loop}
            {run the innermost loop for the 4×3 tile}
            /*now run 3×3 tiling*/
            for (; j<n; j+=3) {compute using the 3×3 tiling}
            /*now run 2×3 tiling*/
            for (; j<n; j+=2) {compute using the 2×3 tiling}
    }

Note this approach has minimal overhead. Also note that by setting the variable nleft we can easily select a combination of different tilings. For example, in the case where (nmod equals 1) nleft equals 11 and the system computes 4*(nc−2) columns using 4×3 tilings and 9 columns using 3×3 tilings.

Two-Dimensional Rectangular Representation for Supernodes

Figure 7:
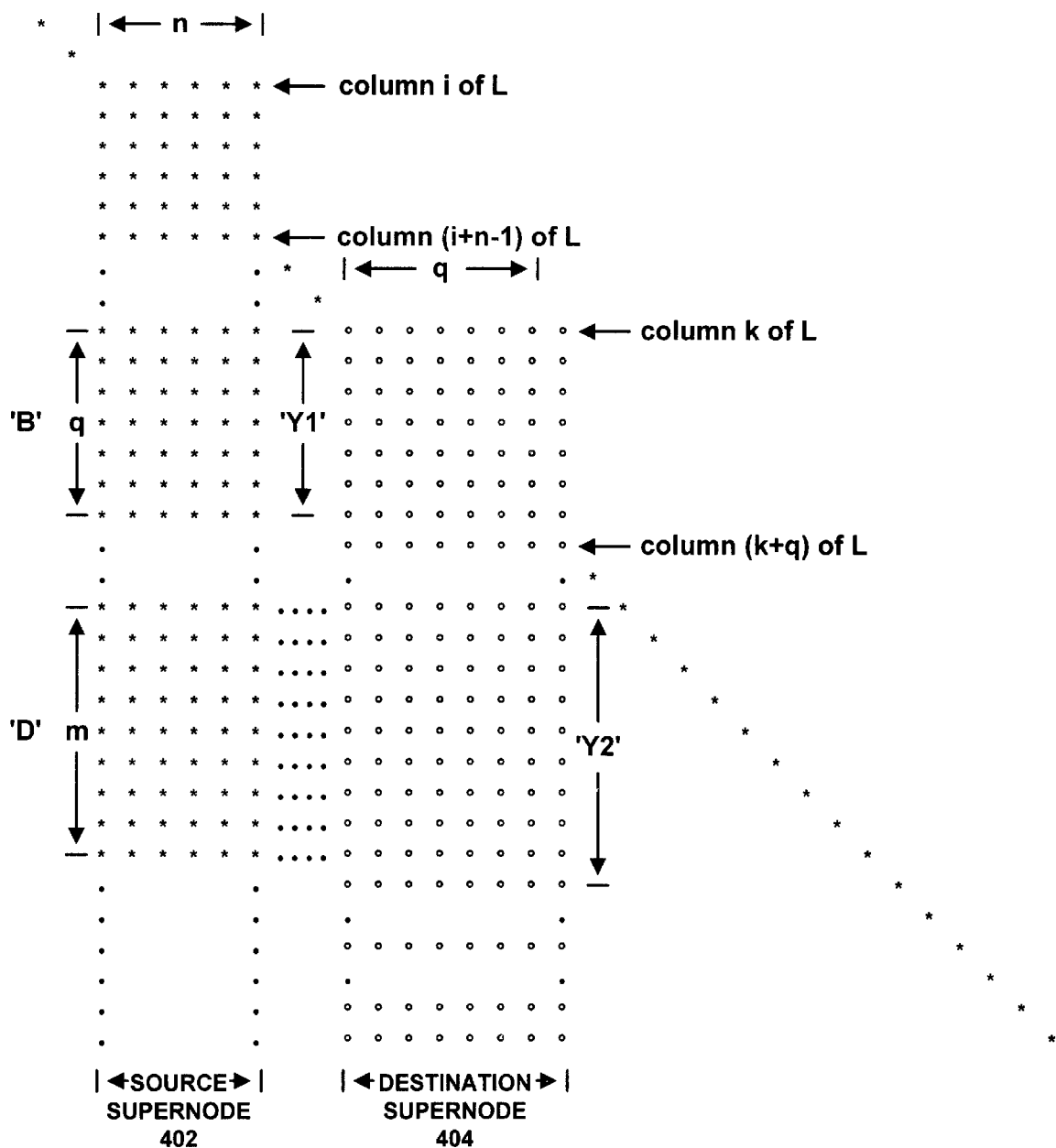
FIG. 7 illustrates a two-dimensional rectangular representation for supemodes in accordance with an embodiment of the present invention.

FIG. 7 illustrates a two-dimensional rectangular representation for supernodes in accordance with an embodiment of the present invention. Note that the lower-triangular Y1 portions of supernodes are converted into rectangular form. With supernodes in this rectangular form it is easier to use library routines which are structured to deal with two-dimensional rectangular representations (such as the BLAS3 routines) to perform the computations. Use of these library routines can result in an increase in computational speed. However, using a two-dimensional rectangular representation also uses additional memory, and thereby increases the memory overhead of the computation. (Note any discussions regarding the BLAS3 routines in this specification are merely exemplary. The present invention can generally apply to any routines that operate on two-dimensional representations, and is not limited to BLAS3 routines.)

The memory overhead can be calculated as follows. Let $N\_s$=total number of supernodes in the matrix; let $N\_r$=number of rows/columns in the matrix; and let $n\_i$=number of columns in supernode i; i=1 . . . $N\_s$. Then $N\_r$=Sum $(n\_i)$ over i; i=1 . . . $N\_s$. The memory overhead in the 2D scheme compared to the trapezoidal scheme is $M\_over\_2d$=Sum$[(n\_i*(n\_i+1))/2]$ over i; i=1 . . . $N\_s$.

Splitting Supernodes Into Panels

Figure 8:
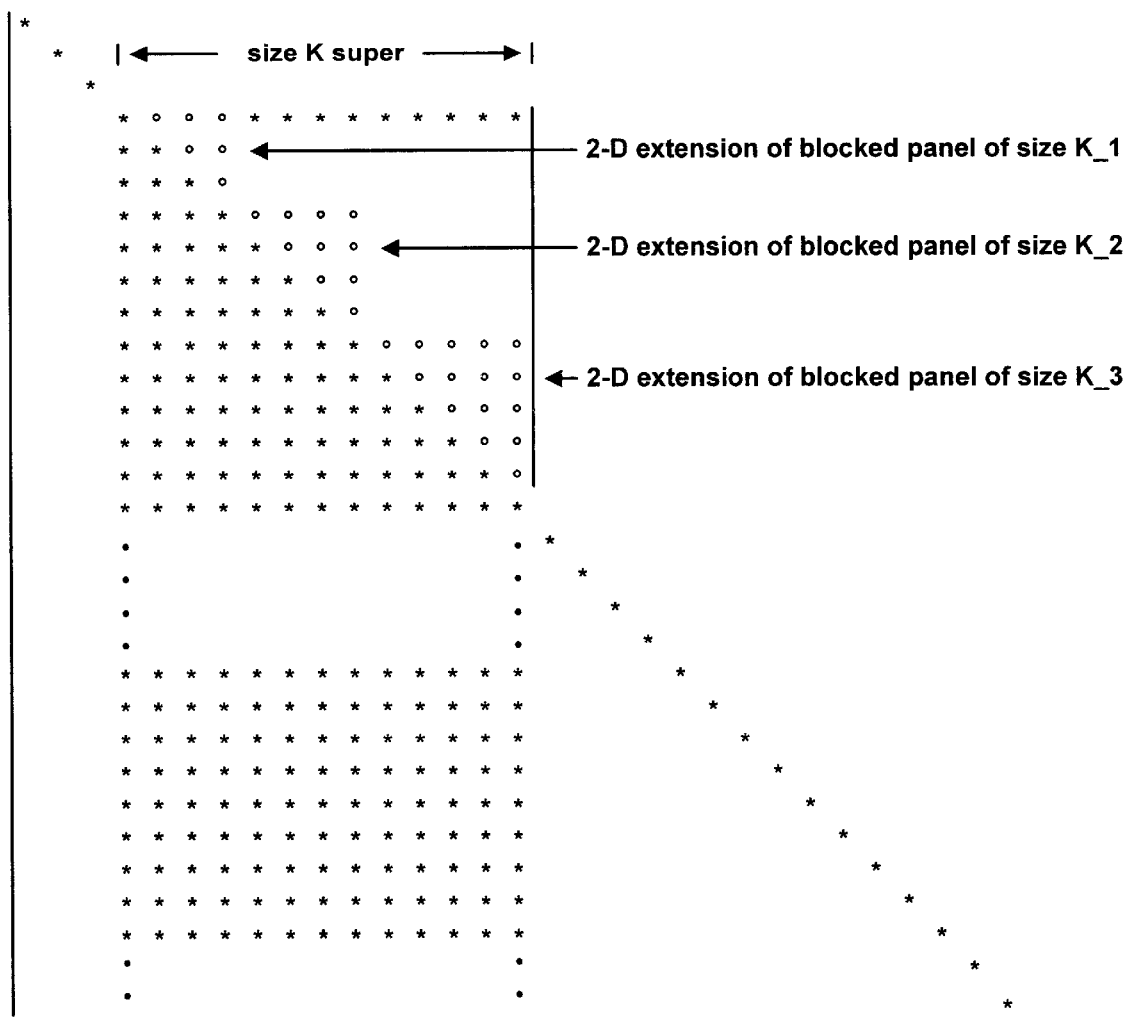
FIG. 8 illustrates a two-dimensional rectangular representation for a supernode after the supernode has been divided into panels in accordance with an embodiment of the present invention.

An effective way to reduce this overhead is through pre-splitting of the supernodes into "panels" that fit in the cache. (This process is also known as cache-splitting or cache blocking). For example, FIG. 8 illustrates a two-dimensional rectangular representation for a supernode after the supernode has been divided into panels in accordance with an embodiment of the present invention. Note that the cache-splitting of supernodes has other advantages in both serial and parallel factorization, such as better load balancing.

The decreased memory overhead due to cache-splitting can be computed as follows. Let K=the size of supernodes (# columns) before splitting. Assume that cache-splitting divides the supernode illustrated in FIG. 8 into three panels of sizes $K\_1$, $K\_2$ and $K\_3$, respectively.

The memory overhead before cache-splitting is M(before splitting)=$(K*(K+1))/2$ words of data. The memory overhead after cache-splitting is M(after splitting)=$(K\_1*(K\_1+1))/2+(K\_2*(K\_2+1))/2+(K\_3*(K\_3+1))/2$ words of data. Hence, M(before splitting)=M(after splitting)+M (remainder). Where M(remainder)=$0.5*[(K\_1*(K\_2+K\_3))+(K\_2*(K\_1+\_K\_3))+(K\_3*(K\_1+K\_2))]>0$, which is the decrease in overhead caused by cache splitting.

Hybrid Representation for Supernodes

Figure 9A:
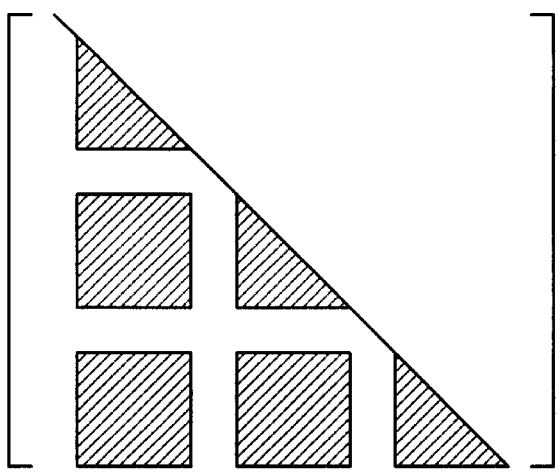
FIG. 9A illustrates a one-dimensional trapezoidal representation for supernodes in accordance with an embodiment of the present invention.
Figure 9B:
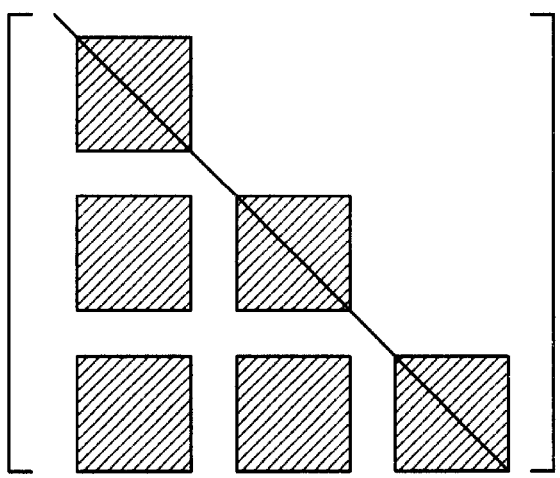
FIG. 9B illustrates a two-dimensional rectangular representation for supernodes in accordance with an embodiment of the present invention.
Figure 9C:
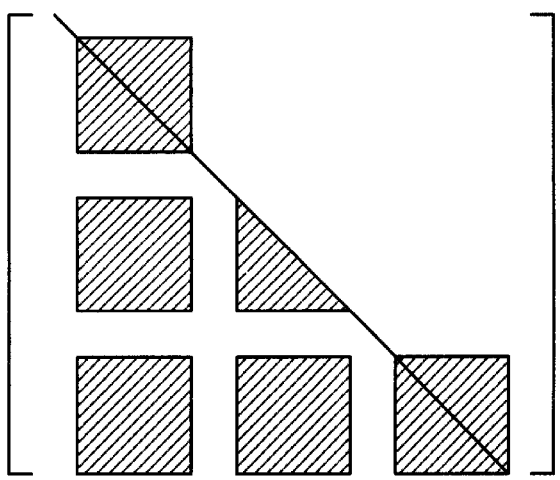
FIG. 9C illustrates a hybrid one-dimensional trapezoidal and two-dimensional rectangular representation for supernodes in accordance with an embodiment of the present invention.

One embodiment of the present invention can use a number of different representation for supernodes. FIG. 9A illustrates a one-dimensional trapezoidal representation for supernodes in accordance with an embodiment of the present invention. FIG. 9B illustrates a two-dimensional rectangular representation for supernodes in accordance with another embodiment of the present invention. FIG. 9C illustrates a hybrid one-dimensional trapezoidal and two-dimensional rectangular representation for supernodes in accordance with yet another embodiment of the present invention.

Referring to FIG. 9C, note that the hybrid representation stores supernodes in either a compact one-dimensional trapezoidal storage scheme (middle supernode) or a two-dimensional rectangular storage scheme (right and left supernodes). In the hybrid representation, the choice of whether to use the one-dimensional or the two-dimensional storage schemes for a supernode is made by computing a function "R" which is based on the structure of the supernode. If a result of the function R is greater than a threshold value, then the two-dimensional representation is used. Otherwise, the one-dimensional representation is used. An example of the function R is described in more detail below.

For example, in a commonly used method for computing an update from a supernode, the entire update from a supernode to the rest of the matrix (on its right) is a lower triangular matrix. Let M be the dense matrix representing the dense sub-blocks of a supernode below the apex triangle. Then the update from this supernode to the rest of matrix is $Z=MM^T$, where M is the matrix of size $(m+q)*n$ (from FIG. 4), and Z is the lower triangular matrix of size $(m+q)*(m+q)$.

The entire update is never computed in our method but is broken into smaller individual updates ("CMOD's"), the number of which depends on the matrix structure.

As described earlier, a supernode-supernode update produces a trapezoidal matrix Y composed of Y1 and Y2. Assume $N\_u$ is the number of supernode-supernode updates from supernode $S\_k$ (of size K-cols). Also assume that $Y\_i$=i-th Y-update, where i=1 . . . $N\_u$. Then using the notation Ops(x) to represent the number of floating operations in processing X, the following relations hold: $Ops(Z) = Sum[Ops(Y\_i)]$ over i; i=1 . . . $N\_u$; $Ops(Z)=(m+q)*(m+q)*k$; and $Ops(Y\_i)=Ops([Y1]\_i)+Ops([Y2]\_i)$.

From FIG. 4, we see that $Ops([Y1]\_i)=q*q*k$; $Ops([Y2]\_i)=m*q*k$; and $Ops(Y\_i)=(m+q)*q*k$. If, for example, Ops(Y1_tot)=total number of Y1 operations in this supernode, and Ops(Y2_tot)=total number of Y2 operations in this supernode, then Ops(Z)=Ops(Y1_tot)+Ops(Y2_tot), and R=Ops(Y2_tot)/Ops(Y1_tot)=Ops(Z)/Ops(Y1_tot)−1. One can show that R>=1 holds for all bona fide supernode splittings.

Note that the above-described process for computing the function R is based on the number of computational operations involved in computing Y2 versus the number of computational operations involved in computing Y1. Alternatively, the function R can be based on the memory overhead involved in using a two-dimensional representation for the supernode versus the memory overhead involved in using a one-dimensional representation.

In the hybrid storage scheme, the choice of one-dimensional trapezoidal or two-dimensional rectangular representation is made automatically (by computing the function R as was described above), and the solver adapts to the problem structure and machine characteristics at run-time.

The storage layout algorithm/implementation proceeds as follows. (1) All three storage schemes are implemented, including one-dimensional trapezoidal, two-dimensional rectangular and hybrid. (2) The user is allowed to choose one of the three storage schemes. (This is accomplished by using a parameter passed to a function and/or an environment variable). The user makes this choice based on the memory storage and computational requirements of the computation. The default storage scheme is the hybrid scheme. (3) A cache-splitting of supernodes is performed as described above and the actual storage allocation is based on the choice of the scheme (determined in step 2), and is performed after cache-splitting.

Note that in the hybrid storage scheme, the root supernode is treated specially. This is because in most problems, the root supernode is a dense triangle and benefits significantly from the use of BLAS3 operations. Hence, for the root supernode (in the pre-cache-splitting supernode partition ordering), a two-dimensional rectangular storage scheme is used. However, to decrease memory overhead the two-dimensional scheme is performed on the split panels of the root supernode (see FIG. 8).

For example, assume $N\_s$=the total number of supernodes in the problem after cache splitting, and $N\_r$=the number of panels in the split root supernode. In order to use the hybrid representation, the system does the following:

```
for (i=1 . . . [N_s–N_r]) {
    compute R for supernode panel i
    if R>R_cut then use 2-D representation for supernode
        panel i
    else use 1-D representation for supernode panel i
}
for (i=[N_s–N_r+1] . . . N_s) {
    use 2-D representation or supernode panel i
}
```

In one embodiment of the present invention, the optimal threshold value for the parameter R on a representative workload has been empirically determined to be about 4.0, although other threshold values can be used for other workloads.

Figure 10:
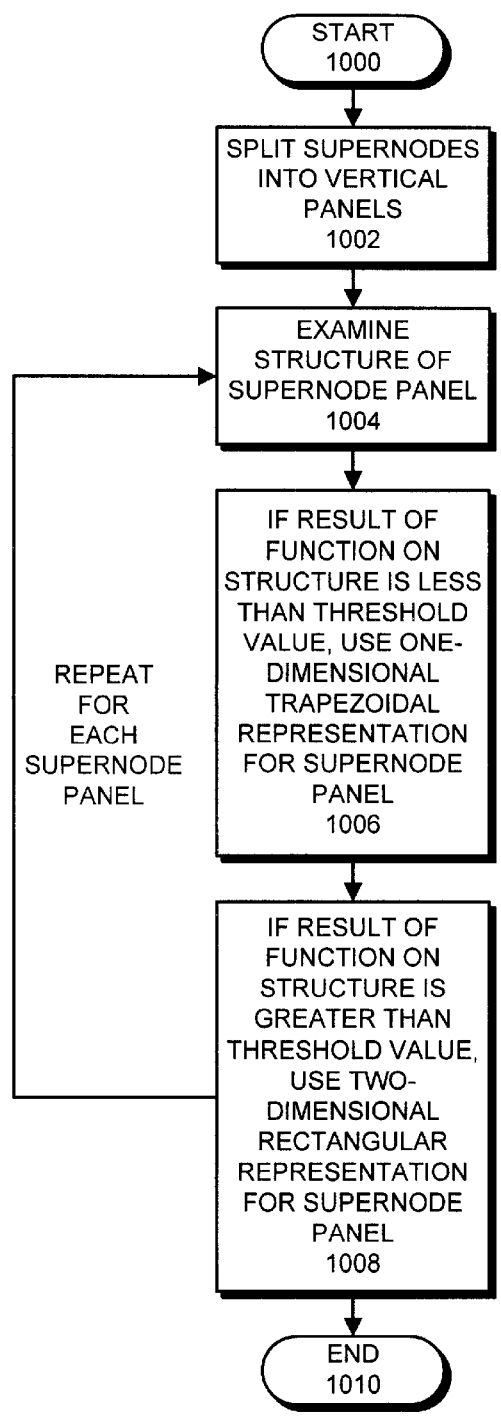
FIG. 10 is a flow chart illustrating the process of using a hybrid representation for supernodes during the CMOD operation in accordance with an embodiment of the present invention.

FIG. 10 is a flow chart illustrating the process of using a hybrid representation for supernodes during the CMOD. operation in accordance with an embodiment of the present invention. The system starts by cache-splitting the supernodes into vertical panels (step 1002). Next, the system performs a number of steps for each supernode panel. First, the system examines the structure of the supernode panel (step 1004). Next, if a result of the function "R" on the supernode panel is less than or equal to a threshold value, the system uses a one-dimensional trapezoidal representation for the supernode panel during the CMOD operation (step 1006). If the result of the function on the structure of the supernode panel is greater than the threshold value, the system uses a two-dimensional rectangular representation for the supernode panel during the CMOD operation (step 1008).

In one embodiment of the present invention, the system uses library routines to compute updates involving source supernodes that are stored in a two-dimensional rectangular representation, and uses kernels written in a high-level language to compute updates involving source supernodes that are stored in a one-dimensional trapezoidal representation. The structure of the destination supernode is not as important because the result is distributed to the destination supernode during a later scattering step (illustrated as step 306 of FIG. 3).

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. Additionally, the above disclosure is not intended to limit the invention. The scope of the invention is defined by the appended claims.

What is claimed is:

1. A method for efficiently solving a system of equations involving a sparse matrix, comprising:
    identifying a plurality of supernodes in the sparse matrix, each supernode comprising a set of contiguous columns having a substantially similar pattern of non-zero elements; and
    performing a complex modification (CMOD) operation on the plurality of supernodes including doing the following for each supernode,
        determining a structure of the supernode,
        using a one-dimensional trapezoidal representation for the supernode during the CMOD operation if a result of a function on the structure of the supernode is lower than a threshold value, and
        using a two-dimensional rectangular representation for the supernode during the CMOD operation if the result of the function on the structure of the supernode is greater than the threshold value;

wherein the function on the structure of the supernode is a function of memory requirements for storing the supernode in the two-dimensional rectangular representation and rnemoirX requirements for storing the supernode in the one-dimnensional trapezoidal representation; and wherein choosing between the one-dimensional trapezoidal representation and the two-dimensional rectangular representation automatically adapts the method to a problem structure and machine characteristics at runtime of a computer system.

2. The method of claim 1, further comprising performing a complex division (CDIV) operation on the plurality of supernodes prior to performing the CMOD operation, the CDIV operation dividing each element in each column by a scalar value.

3. The method of claim 1, wherein the function on the structure of the supernode is a function of a number of computational operations involved in computing a lower-triangular sub-block portion of the supernode and a number of computational operations involved in computing a rectangular sub-block portion of the supernode.

4. The method of claim 1, further comprising splitting each supernode into vertical panels that fit into cache lines prior to performing the CMOD operation.

5. The method of claim 1, further comprising using the two-dimensional rectangular representation for the supernode during the CMOD operation if the supernode is a root supernode.

6. The method of claim 1, wherein performing the CMOD operation further comprises:

storing a result of the CMOD operation in a temporary vector; and scattering a contents of the temporary vector into a destination representation of the sparse matrix.

7. A computer-readable storage medium storing instructions that when executed by a computer cause the computer to perform a method for efficiently solving a system of equations involving a sparse matrix, comprising:

identifying a plurality of supernodes in the sparse matrix, each supernode comprising a set of contiguous columns having a substantially similar pattern of non-zero elements; and performing a complex modification (CMOD) operation on the plurality of supemodes including doing the following for each supernode, determining a structure of the supernode, using a one-dimensional trapezoidal representation for the supemode during the CMOD operation if a result of a function on the structure of the supernode is lower than a threshold value, and using a two-dimensional rectangular representation for the supernode during the CMOD operation if the result of the function on the structure of the supernode is greater than the threshold value;

wherein the function on the structure of the supernode is a function of memery requirements for storing the supernode in the two-dimensional rectangular representation and memory requirements for storing the supernode in the one-dimensional trapezoidal representation; and wherein choosing between the one-dimensionial trapezoidal representation and the two-dimensional rectangular representation automatically adapts the method to a problem structure and machine characteristics at runtime of a computer system.

8. The computer-readable storage medium of claim 7, wherein the method further comprises performing a complex division (CDIV) operation on the plurality of supernodes prior to performing the CMOD operation, the CDIV operation dividing each element in each column by a scalar value.

9. The computer-readable storage medium of claim 7, wherein the function on the structure of the supernode is a function of a number of computational operations involved in computing a lower-triangular sub-block portion of the supernode and a number of computational operations involved in computing a rectangular sub-block portion of the supernode.

10. The computer-readable storage medium of claim 7, wherein the method further comprises splitting each supernode into vertical panels that fit into cache lines prior to performing the CMOD operation.

11. The computer-readable storage medium of claim 7, wherein the method further comprises using the two-dimensional rectangular representation for the supemode during the CMOD operation if the supernode is a root supernode.

12. The computer-readable storage medium of claim 7, wherein performing the CMOD operation further comprises:

storing a result of the CMOD operation in a temporary vector; and scattering a contents of the temporary vector into a destination representation of the sparse matrix.

13. An apparatus that efficiently solves a system of equations involving a sparse matrix, comprising:

an identification mechanism that is configured to identify a plurality of supernodes in the sparse matrix, each supernode comprising a set of contiguous columns having a substantially similar pattern of non-zero elements; and a computational mechanism that is configured to perform a complex modification (CMOD) operation on the plurality of supernodes including doing the following for each supernode, determining a structure of the supernode, using a one-dimensional trapezoidal representation for the supernode during the CMOD operation if a result of a function on the structure of the supernode is lower than a threshold value, and using a two-dimensional rectangular representation for the supernode during the CMOD operation if the result of the function on the structure of the supernode is greater than the threshold value;

wherein the function on the structure of the supernode is a function of memory requirements for storing the supernode in the two-dimensional rectangular representation and memory requirements for storing the supernode in the one-dimensional trapezoidal representation; and wherein choosing between the one-dimensional trapezoidal representation and the two-dimensional rectangular representation automatically adapts the solver to a problem structure and machine characteristics at runtime of a computer system.

14. The apparatus of claim 13, wherein the computational mechanism is further configured to perform a complex division (CDIV) operation on the plurality of supernodes prior to performing the CMOD operation, the CDIV operation dividing each element in each column by a scalar value.

15. The apparatus of claim 13, wherein the function on the structure of the supernode is a function of a number of computational operations involved in computing a lower-triangular sub-block portion of the supernode and a number of computational operations involved in computing a rectangular sub-block portion of the supernode.

16. The apparatus of claim 13, wherein the computational mechanism is further configured to split each supernode into vertical panels that fit into cache lines prior to performing the CMOD operation.

17. The apparatus of claim 13, wherein the computational mechanism is further configured to use the two-dimensional rectangular representation for the supernode during the CMOD operation if the supemode is a root supernode.

18. The apparatus of claim 13, wherein the computational mechanism is further configured to:
  store a result of the CMOD operation in a temporary vector; and to
  scatter a contents of the temporary vector into a destination representation of the sparse matrix.

* * * * *

UNITED STATES PATENT AND TRADEMARK OFFICE
CERTIFICATE OF CORRECTION

PATENT NO.   : 6,601,080 B1
DATED        : July 29, 2003
INVENTOR(S)  : Rajat P. Garg It is certified that error appears in the above-identified patent and that said Letters Patent is hereby corrected as shown below:

Column 15,
Line 6, please delete the word, "rnemoirX" and replace with the word
-- memory --.

Signed and Sealed this

Eleventh Day of November, 2003

JAMES E. ROGAN
*Director of the United States Patent and Trademark Office*